UNITED STATES PATENT OFFICE 2,389,417

REACTION PRODUCTS OF ALDEHYDES AND TRIAZINE DERIVATIVES

Gaetano F. D'Alelio and James W. Underwood, Pittsfield, Mass., assignors to General Electric Company, a corporation of New York No Drawing. Application October 12, 1942, Serial No. 461,769

22 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxy-aldehydes and aldehyde-addition products, e. g., formaldehyde, paraformaldehyde, aldol, glucose, dimethylol urea, trimethylol melamine, etc., and a triazine derivative corresponding to the following general formula:

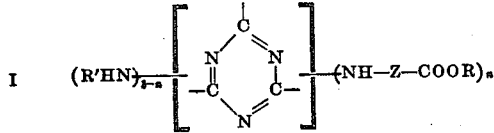

In the above formula $n$ represents an integer and is at least 1 and not more than 3, R represents a member of the class consisting of monovalent aliphatic hydrocarbon radicals and monovalent aromatic and nuclearly substituted, specifically nuclearly halogenated, aromatic hydrocarbon radicals, R' represents a member of the class which is the same as R and in addition hydrogen, and Z represents a member of the class consisting of divalent aliphatic hydrocarbon radicals and divalent aromatic and nuclearly substituted, specifically nuclearly halogenated, aromatic hydrocarbon radicals. From the above formula it will be noted that when $n$ is 3 there will be no —NHR' groups attached to the triazine nucleus.

This application is a continuation-in-part of our copending application Serial No. 456,928, filed September 1, 1942, now Patent No. 2,328,961, issued Sept. 7, 1943, and assigned to the same assignee as the present invention.

Illustrative examples of monovalent radicals that R and R' in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and aryl, aliphatic-substituted aryl and aryl-substituted aliphatic radicals wherein one or more of the hydrogen atoms of the aryl nucleus have been substituted by, for example, a halogen, more particularly chlorine, bromine, fluorine or iodine. More specific examples of monovalent, nuclearly substituted, specifically nuclearly halogenated, aromatic hydrocarbon radicals that R and R' may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents hydrogen, in which case the compounds may be represented by the general formula

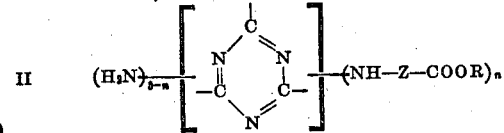

where $n$, Z and R have the same meanings as given above with reference to Formula I.

Illustrative examples of divalent radicals that Z in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclohexylene, cyclohexenylene, cycloheptylene, etc.; divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4,alpha-tolylene, 3,beta-phenyleneethyl, 4,alpha-xylylene, 2,gamma-phenylenebutyl, etc.; and their homologues, as well as those divalent radicals with one or more of their hydrogen atoms replaced by a substituent, e. g., sulfamyl, acyl, alkyl, alkenyl, hydroxy, alkoxy, aryloxy, a —COOR grouping in addition to the single —COOR grouping shown in the above formulas, etc. Specific examples of substituted divalent radicals that Z may represent are: chlorophenylene, bromophenylene, chloroxenylene, chloronaphthylene, chlorotolylene, bromotolylene, ethoxyphenylene, acetophenylene, sulfamylphenylene, acetoxyphenylene, aminophenylene, hydroxyphenylene, phenoxyphenylene, methylphenylene (tolylene), allylphenylene, etc. Preferably Z represents a phenylene, tolylene or ethylene radical.

The triazine derivatives that are employed in carrying the present invention into effect are more fully described and are specifically claimed in our copending parent application Serial No. 456,928, now Patent No. 2,328,961.

Among the triazine derivatives embraced by Formula I that may be used in producing the new condensation products of the present invention are:

The carboaliphaticoxyaliphaticamino diamino [(—NHR)₂] s-triazines
The carboaromaticoxyaliphaticamino diamino [(—NHR)₂] s-triazines
The carbohalogenoaromaticoxyaliphaticamino diamino [(—NHR)₂] s-triazines
The carboaliphaticoxyaromaticamino diamino [(—NHR)₂] s-triazines
The carboaromaticoxyaromaticamino diamino [(—NHR)₂] s-triazines
The carboaliphaticoxyhalogenoaromaticamino diamino [(—NHR)₂] s-triazines
The carbohalogenoaromaticoxyaromaticamino diamino [(—NHR)₂] s-triazines
The carboaromaticoxyhalogenoaromaticamino diamino [(—NHR)₂] s-triazines
The carbohalogenoaromaticoxyhalogenoaromaticamino diamino [(—NHR)₂] s-triazines
The di-(carboaliphaticoxyaliphaticamino) amino (—NHR) s-triazines
The di-(carboaromaticoxyaliphaticamino) amino (—NHR) s-triazines
The di-(carbohalogenoaromaticoxyaliphaticamino) amino (—NHR) s-triazines
The di-(carboaliphaticoxyaromaticamino) amino (—NHR) s-triazines
The di-(carboaromaticoxyaromaticamino) amino (—NHR) s-triazines
The di-(carboaliphaticoxyhalogenoaromaticamino) amino (—NHR) s-triazines
The di-(carbohalogenoaromaticoxyaromaticamino) amino (—NHR) s-triazines
The di-(carboaromaticoxyhalogenoaromaticamino) amino (—NHR) s-triazines
The di-(carbohalogenoaromaticoxyhalogenoaromaticamino) amino (—NHR) s-triazines
The tri-(carboaliphaticoxyaliphaticamino) s-triazines
The tri-(carboaromaticoxyaromaticamino) s-triazines
The tri-(carbohalogenoaromaticoxyaliphaticamino) s-triazines
The tri-(carboaromaticoxyaliphaticamino) s-triazines
The tri-(carboaliphaticoxyaromaticamino) s-triazines
The tri-(carboaliphaticoxyhalogenoaromaticamino) s-triazines
The tri-(carbohalogenoaromaticoxyaromaticamino) s-triazines
The tri-(carboaromaticoxyhalogenoaromaticamino) s-triazines
The tri-(carbohalogenoaromaticoxyhalogenoaromaticamino) s-triazines More specific examples of compounds embraced by Formula I that may be used in carrying the present invention into effect are listed below:

Para-carboethoxyanilino diamino s-triazine
Meta-carbopropoxytoluido di-(methylamino) s-triazine
Carboethoxymethylamino diamino s-triazine
Di-(carboethoxyethylamino) amino s-triazine
Alpha-carboethoxyisobutylamino diamino s-triazine
Alpha-carbopropoxypropylamino dianilino s-triazine
Ortho-carbomethoxyanilino di-(ethylamino) s-triazine
Meta-carboethoxyanilino di-(butylamino) s-triazine
(Para-carbobenzyloxy meta-hydroxy anilino) di-(benzylamino) s-triazine
Carbobenzyloxymethylamino ethylamino amino s-triazine
Gamma-carbomethoxyamylamino diamino s-triazine
Gamma-carboethoxyamylamino ditoluido s-triazine
Gamma-carbobutoxybutylamino diamino s-triazine
Ortho-carboethoxyanilino carboethoxymethylamino amino s-triazine
Ortho-carboethoxyanilino di-(ethylanilino) s-triazine
Meta-carboethoxyanilino di-(phenethylamino) s-triazine
Para-carbomethoxyanilino di-(chloroanilino) s-triazine
Ortho-carboethoxyanilino di-(carboethoxymethylamino) s-triazine
Tri-(carbopropoxymethylamino) s-triazine
Tri-(carboethoxyanilino) s-triazines
Tri-(carbomethoxytoluido) s-triazines
Di-(meta-carbopropoxytoluido) amino s-triazine
Di-(ortho-carboethoxyanilino) methylamino s-triazine
Di-(ortho-carboethoxyanilino) anilino s-triazine
Di-(ortho-carboethoxyanilino) chloroanilino s-triazine
Di-(beta-carboethoxypropylamino) amino s-triazine
Di-(beta-carbophenoxyethylamino) amino s-triazine
Tri-(carbophenoxyanilino) s-triazines
Di-(para-carbomethoxyanilino) allylamino s-triazine
Di-(meta-carboethoxyanilino) cyclohexylamino s-triazine
Di-(ortho-carbopropoxyanilino) phenethylamino s-triazine
Ortho-carbomethoxyanilino diamino s-triazine
Meta-carbomethoxyanilino diamino s-triazine
Para-carbomethoxyanilino diamino s-triazine
Tri-(ortho-cargomethoxyanilino) s-triazine
Tri-(meta-carbomethoxyanilino) s-triazine
Tri-(para-carbomethoxyanilino) s-triazine
Di-(Ortho-carbomethoxyanilino) amino s-triazine
Ortho-carbomethoxyanilino di-(methylamino) s-triazine
Di-(para-carbomethoxyanilino) amino s-triazine
Meta-carboethoxytoluido diamino s-triazine
Ortho-carbophenoxyanilino diamino s-triazine
Meta-carbophenoxyanilino diamino s-triazine
Para-carbophenoxyanilino diamino s-triazine The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in our copending parent application Serial No. 456,928, now Patent No. 2,328,961.

Resins heretofore have been made by condensing an aldehyde with certain aminotriazines, e. g., melamine, ammeline and thioammeline ether. The suggestion also has been made that resinous materials be prepared by condensing an aliphatic aldehyde containing a chain of at the most six carbon atoms with compounds of the general formula

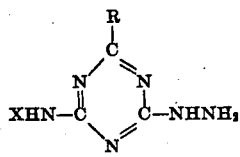

wherein X stands for a member of the group consisting of hydrogen and —NH$_2$, and R represents a member of the class consisting of hydrazino, phenyl, hydroxy, alkoxy and thioether groups and halogen atoms. Such resins usually have excellent heat and water resistance, but due to their inherent basicity are deficient in other properties that are desirable in a resin to be used in the production of molding compositions and molded articles. Resinous reaction products of an aldehyde with, for example, an amino carboaliphaticoxy (or carboaromaticoxy) aromatic hydrocarbon, e. g., a methyl amino benzoate, on the other hand, usually have much better flow characteristics than the aminotriazine-aldehyde resins, specifically melamine-formaldehyde resins, but are less resistant to water and, from a practical standpoint, may be considered to be "non-curing" (heat-non-hardenable). The resinous condensation products of the present invention have a high water resistance and a rate of cure approximating that of the known aminotriazine-aldehyde resins plus the improved flow characteristics of the resinous reaction products of an aldehyde with an amino carboaliphaticoxy (or carboaromaticoxy) aromatic hydrocarbon. The color and arc resistance of our new resins are, in general, likewise much better than that of resins prepared by condensing an aldehyde with an amino carboaliphaticoxy (or carboaromaticoxy) aromatic hydrocarbon, e. g., an alkyl amino benzoate.

Thus it is seen that the present invention provides a resinous composition which has combined therein the desirable properties of (1) the known aminotriazine-aldehyde resins and (2) the known condensation products of an aldehyde with an amino carboaliphaticoxy (or carboaromaticoxy) aliphatic or aromatic hydrocarbon without sacrifice of other useful properties. This is a surprising and unexpected result that in no way could have been predicted. Because of the unique properties of the resins of this invention, they are suitable for molding and other applications for which the ordinary aminotriazine-aldehyde resins and resinous condensation products of an aldehyde with an amino carboaliphaticoxy (or carboaromaticoxy) aromatic hydrocarbon, as well as other resins of the aminoplast type, e. g., urea-aldehyde resins, are unsuited.

In carrying our invention into effect the initial condensation reaction may be effected at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is often desirable to cause the initial condensation reaction to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, other natural or synthetic resinous bodies, or while admixed with other materials that also can react with the aldehydic reactant or with the triazine derivative, e. g., urea (NH$_2$CONH$_2$), thiourea, selenourea, iminourea (guanidine), substituted ureas, thioureas, selenoureas and iminoureas, e. g., urea derivatives such as mentioned in D'Alelio Patent No. 2,285,418, issued June 9, 1942, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of one or both of us for instance in D'Alelio copending application Serial No. 377,524, filed February 5, 1941, and in applications referred to in said copending application, which has now matured into Patent No. 2,377,868, issued June 12, 1945; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol propylene glycol, glycerine, polyvinyl alcohol, etc.; amines, including aromatic amines, e. g., aniline, etc.; and the like.

The modifying reactants may be incorporated with the triazine derivative and the aldehyde to form an inter-condensation product by mixing all the reactants and effecting condensation therebetween or by various permutations of reactants as described, for example, in D'Alelio Patent No. 2,281,559, issued May 5, 1942 (page 2, column 1, lines 49–69), with particular reference to reactions involving a non-haloacylated urea, a halogenated acylated urea and an aliphatic aldehyde. For instance, we may form a partial condensation product of ingredients comprising (1) urea or melamine or urea and melamine, (2) a triazine derivative of the kind embraced by Formula I, for example a carboaliphaticoxyaromaticamino diamino s-triazine, more particularly a carboalkoxyanilino diamino s-triazine (e. g., an ortho-, meta- or para-carbomethoxyanilino diamino s-triazine, a carbophenoxyanilino diamino s-triazine, etc.), a di-(carboaliphaticoxyaromaticamino) amino s-triazine, more particularly a di-(carboalkoxyanilino) amino s-triazine, a tri-(carboaliphaticoxyaromaticamino) s-triazine, more particularly a tri-(carboalkoxyanilino) s-triazine, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated plywood and other laminated articles, and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Ortho-carbomethoxyanilino diamino s-triazine | 104.0 |
| Aqueous formaldehyde (approx. 37.1% HCHO) | 97.2 |
| Aqueous ammonia (approx. 28% NH₃) | 10.0 |
| Sodium hydroxide in 5 parts water | 0.1 |
| Chloroacetamide (monochloroacetamide) | 1.0 |

All of the above ingredients with the exception of the chloroacetamide were heated together under reflux at the boiling temperature of the mass for 30 minutes, yielding a water-white resinous syrup. When a small sample of this syrup was heated on a 140° C. hot plate, it was converted into a thermoelastic resin. The above-stated amount of chloroacetamide was now added to the main batch of resinous syrup and heating under reflux was continued for an additional 7 minutes. The resulting syrup was mixed with 70 parts alpha cellulose in flock form and 0.4 part of a mold lubricant, specifically zinc stearate, to form a molding (moldable) composition. The wet molding compound was dried for 2½ hours at 60° C. A sample of the dried and ground molding composition was molded for 5 minutes at 130° C. under a pressure of 2,000 pounds per square inch. The molded piece was well cured throughout and had an excellent gloss and surface finish. It also had outstanding resistance to water as evidenced by the fact that it absorbed only 0.25% by weight of water when immersed in boiling water for 15 minutes, followed by immersion in cold water for 5 minutes. The molding compound showed very good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

*Example 2*

| | Parts |
|---|---|
| Ortho-carbomethoxyanilino diamino s-triazine | 26.0 |
| Urea | 24.0 |
| Aqueous formaldehyde (approx. 37.1% HCHO) | 81.0 |
| Aqueous ammonia (approx. 28% NH₃) | 5.0 |
| Sodium hydroxide in 5 parts water | 0.1 |
| Chloroacetamide | 0.5 |

All of the above ingredients with the exception of the chloroacetamide were heated together under reflux at the boiling temperature of the mass for 30 minutes, yielding a water-white syrup that bodied to a thermoplastic (but potentially heat-curable) resin when a small sample of it was heated on a 140° C. hot plate. The above-stated amount of chloroacetamide was now added to the main batch of the resinous syrup and heating under reflux was continued for an additional 5 minutes. A molding compound was prepared by mixing the resulting resinous syrup with 35 parts alpha cellulose and 0.4 part zinc stearate. The wet molding composition was dried for 15 hours at room temperature. A well-cured molded piece was obtained by molding a sample of the dried and ground molding compound for 5 minutes at 130° C. under a pressure of 2,000 pounds per square inch. The molded article had excellent resistance to water as shown by the fact that it absorbed only 0.6% by weight of water when tested for its water resistance as described under Example 1. (When similarly tested for water resistance, molded articles made from the ordinary urea-formaldehyde molding compounds usually absorb about 5 to 7% by weight of water.) The plasticity of the molding compound during molding was very good.

*Example 3*

| | Parts |
|---|---|
| Synthetic phenol | 45.0 |
| Aqueous formaldehyde (approx. 37.1% HCHO) | 97.5 |
| Potassium carbonate | 1.43 |
| Ortho-carbomethoxyanilino diamino s-triazine | 4.5 |

A liquid phenol-formaldehyde partial condensation product was prepared by heating together all of the above ingredients with the exception of the triazine derivative for 4 hours at 50° C. The above-tated amount of ortho-carbomethoxyanilino diamino s-triazine was added to this syrupy phenolic resin and heating under reflux at the boiling temperature of the mass was continued for 1 hour. At the end of this reaction period the resulting syrupy intercondensation product was acidified by adding thereto 2.43 parts oxalic acid dissolved in 50 parts water. A molding compound was made from the acidified syrup by mixing therewith 57 parts alpha cellulose and 0.6 part zinc stearate. The wet molding composition was dried for 4 hours at 64° C. A well-cured molded piece was obtained by molding a sample of the dried and ground molding compound for 5 minutes at 130° C. under a pressure of 2,000 pounds per square inch. The molded article was much lighter in color than articles similarly produced from molding compounds containing a resin similarly prepared from phenol and formaldehyde in the absence of ortho-carbomethoxyanilino diamino s-triazine. The molding compound showed very good flow characteristics during molding.

*Example 4*

| | Parts |
|---|---|
| Ortho-carbomethoxyanilino diamino s-triazine | 52.0 |
| Furfural | 59.6 |
| Sodium hydroxide in 5 parts water | 0.1 |
| Water | 100.0 | were heated together under reflux at the boiling temperature of the mass for 15 minutes, yielding a brownish, resinous syrup. When a sample of this syrup was heated on a 140° C. hot plate in the absence of a curing agent, it was converted into a thermoelastic resin. The addition of chloroacetamide, sulfamic acid, citric acid, glycine, oxalic acid or other curing agent such as mentioned under Example 1 either to the syrupy condensation product or to the dehydrated syrup, followed by heating on a 140° C. hot plate, caused the material to convert to a cured or insoluble and infusible state. The resinous composition of this example may be used in the production of molding compounds.

*Example 5*

| | Parts |
|---|---|
| Ortho-carbomethoxyanilino diamino s-triazine | 52.0 |
| Acrolein | 33.6 |
| Sodium hydroxide in 5 parts water | 0.1 |
| Water | 100.0 | were heated together under reflux at the boiling temperature of the mass for 15 minutes. When a sample of the resulting hydrophobic resin was heated on a 140° C. hot plate, it cured to an infusible state in the absence of a curing agent. The addition of a curing agent such as mentioned under Example 1, e. g., sulfamic acid, glycine, nitrourea, citric acid, chloroacetamide, etc., accelerated the cure of the resin to the insoluble and infusible state. The cured resin was resistant to attack by alcohols and various ester and hydrocarbon solvents. The resinous material of this example may be used in the preparation of molding compounds or as a modifier of other synthetic resins.

*Example 6*

| | Parts |
|---|---|
| Ortho-carbomethoxyanilino diamino s-triazine | 52.0 |
| Butyl alcohol | 74.0 |
| Aqueous formaldehyde (approx. 37.1% HCHO) | 64.8 |
| Sodium hydroxide in 5 parts water | 0.1 | were heated together under reflux at the boiling temperature of the mass for 30 minutes, yielding a water-white, syrupy intercondensation product. This syrup bodied to a thermoplastic resin, which was soluble in ethyl alcohol, when a sample of it was heated on a 140° C. hot plate. This resin was potentially heat-curable as shown by the fact that when sulfamic acid, citric acid, chloral urea, glycine, phenacyl chloride or other curing agent such as mentioned under Example 1 was added either to the syrupy condensation product or to the thermoplastic resin, followed by heating on a 140° C. hot plate, the material cured to an insoluble and infusible state. A sample of the syrup was applied to a glass plate and the coated plate was baked for several hours at 60° to 70° C. The baked film was tough, hard and transparent. The resinous composition of this example is especially suitable for use in the preparation of liquid coating and impregnating materials.

*Example 7*

| | Parts |
|---|---|
| Ortho-carbomethoxyanilino diamino s-triazine | 52.0 |
| Acetamide | 12.0 |
| Aqueous formaldehyde (approx. 37.1% HCHO) | 64.8 |
| Sodium hydroxide in 5 parts water | 0.1 | were heated together under reflux at the boiling temperature of the mass for 30 minutes, yielding a clear, colorless syrup that bodied to a thermoplastic resin when a small sample of it was heated on a 140° C. hot plate. This thermoplastic resin was convertible into a thermosetting resin by incorporating therein a small amount of sulfamic acid, citric acid, chloroacetamide, phenacyl chloride or other curing agent such as mentioned under Example 1. When a sample of the thermosetting resin produced in this manner was heated on a 140° C. hot plate, it cured to an insoluble and infusible state.

*Example 8*

| | Parts |
|---|---|
| Ortho-carbomethoxyanilino diamino s-triazine | 52.0 |
| Diethyl malonate | 32.0 |
| Aqueous formaldehyde (approx. 37.1% HCHO) | 64.8 |
| Sodium hydroxide in 5 parts water | 0.1 | were heated together under reflux at the boiling temperature of the mass for 15 minutes, yielding a clear, colorless syrup that bodied to a thermoplastic resin when a small sample of it was heated on a 140° C. hot plate. The curing characteristics of the resinous material of this example were much the same as the resin of Example 7. Cured resins obtained by incorporating various curing agents such as mentioned under Example 1 into the initial syrupy condensation product or into the dehydrated syrup, followed by heating on a 140° C. hot plate, displayed very good resistance to water, alcohols, acids and alkalies.

*Example 9*

| | Parts |
|---|---|
| Ortho-carbomethoxyanilino diamino s-triazine | 52.0 |
| Glycerine | 18.4 |
| Aqueous formaldehyde (approx. 37.1% HCHO) | 64.8 |
| Sodium hydroxide in 5 parts water | 0.1 | were heated together under reflux at the boiling temperature of the mass for 30 minutes, yielding a clear, viscous solution. When a small sample of this resinous syrup was heated on a 140° C. hot plate, it bodied to a thermoplastic resin. This thermoplastic resin was potentially heat-curable as shown by the fact that when sulfamic acid, citric acid, glycine, phenacyl chloride or other curing agent such as mentioned under Example 1 was added either to the initial syrupy condensation product or to the thermoplastic resin, followed by heating on a 140° C. hot plate, the resin cured slowly to an insoluble and infusible state. The excellent plastic flow of the resin during curing indicated that it would be particularly suitable for use as a plasticizer of less plastic aminoplasts and other compatible resins to improve their plasticity or flow characteristics.

*Example 10*

| | Parts |
|---|---|
| Ortho-carbomethoxyanilino diamino s-triazine | 52.0 |
| Polyvinyl alcohol | 52.8 |
| Aqueous formaldehyde (approx. 37.1% HCHO) | 129.6 |
| Sodium hydroxide in 5 parts water | 0.1 |
| Water | 200.0 | were heated together under reflux at the boiling temperature of the mass for 30 minutes, yielding a clear, colorless, very viscous syrup. When a small sample of this syrup was heated on a 140° C. hot plate in the absence of a curing agent, it bodied to a transparent, thermoelastic resin. The pH of the syrup was lowered by adding thereto a small amount of an acid, specifically hydrochloric acid. The acidified syrup was thermosetting, as shown by the fact that it cured to an insoluble and infusible state when a small sample of it was heated on a 140° C. hot plate. Baked films of the thermoset resin were tough and hard, and showed very good resistance to water. Instead of hydrochloric acid other curing agents such as mentioned under Example 1 may be employed to improve the curing characteristics and the water resistance of the resinous material of this example. The thermoplastic resinous product, either with or without a curing agent, may be used in the preparation of various liquid coating and impregnating compositions. The thermosetting resins may be employed in the production of molding compounds.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at the boiling temperature of the mass, the reaction between the components may be carried out at lower temperatures, for example, at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific triazine derivative embraced by Formula I that is named in the above illustrative examples. Thus, instead of ortho-carbomethoxyanilino diamino s-triazine (ortho-carbomethoxyphenylamino diamino s-triazine), we may use, for example, meta-carbomethoxyanilino diamino s-triazine, para-carbomethoxyanilino diamino s-triazine, other carboalkoxyarylamino diamino s-triazines (e. g., a carboethoxyanilino diamino s-triazine, a carbopropoxytoluido diamino s-triazine, etc.), a carboaroxyarylamino diamino s-triazine (e. g., a carbophenoxyanilino diamino s-triazine, a carbophenoxytoluido diamino s-triazine, etc.), a carboalkoxyhalogenoarylamino diamino s-triazine (e. g., a carbobutoxychloroanilino diamino s-triazine, a carbomethoxybromotoluido diamino s-triazine, etc.), a di-(carboaliphaticoxyaromaticamino) amino s-triazine, more particularly a di-(carboalkoxyarylamino) amino s-triazine, e. g., a di-(carbomethoxyanilino) amino s-triazine, a di-(carboethoxytoluido) amino s-triazine, a di-(carbopropoxyxylidino) amino s-triazine, etc., a tri-(carboaliphaticoxyaromaticamino) s-triazine, more particularly a tri-(carboalkoxyarylamino) s-triazine, e. g., a tri-(carboethoxyanilino) s-triazine, a tri-(carbopropoxytoluido) s-triazine, a tri-(carbobutoxyxylidino) s-triazine, or any other triazine derivative of the kind embraced by Formula I, numerous examples of which have been given above and in our copending application Serial No. 456,928, now Patent No. 2,328,961.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, of the aminotriazoles, etc. Particularly good results are obtained with active methylene-containing bodies such as a methylol urea, more particularly monomethylol and dimethylol ureas, and a methylol melamine, e. g., monomethylol melamine and polymethylol melamines (di-, tri-, tetra-, penta- and hexa-methylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending, for instance, upon the particular starting reactants employed and the particular properties desired in the finished product. Ordinarily these reactants are employed in an amount corresponding to at least one mol of the aldehyde, specifically formaldehyde, for each mol of the triazine derivative. Thus, we may use, for example, from 1 to 8 or 9 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 20 or 25 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., acrylonitrile, methacrylonitrile, succinonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g.; polyvinyl acetate, polyvinyl butyrate, etc., polyvinyl ethers, including polyvinyl acetals, specifically polyvinyl formal, etc.

Dyes, pigments, plasticizers, mold lubricants, opacifiers, and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, wood veneer, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

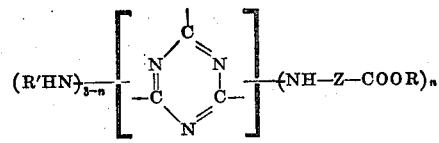

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

2. A composition of matter comprising the product of reaction of ingredients comprising formaldehyde and a compound corresponding to the general formula

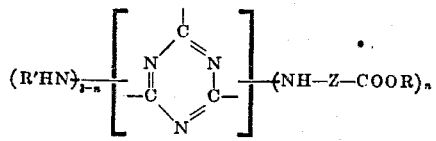

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

3. A composition of matter comprising the product of reaction of ingredients comprising an aldehyde and a compound corresponding to the general formula

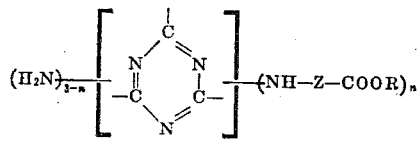

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, and Z represents a divalent aromatic hydrocarbon radical.

4. A composition of matter comprising the product of reaction of ingredients comprising an aldehyde and a compound corresponding to the general formula

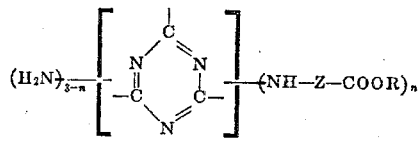

where $n$ represents an integer and is at least 1 and not more than 3, R represents an alkyl radical, and Z represents a divalent aromatic hydrocarbon radical.

5. A composition as in claim 1 wherein the reaction product is the product obtained by effecting initial reaction between the specified components under alkaline conditions.

6. A composition as in claim 1 wherein the reaction product is an alcohol-modified reaction product of the specified components.

7. A heat-curable resinous composition comprising a heat-convertible condensation product of ingredients comprising formaldehyde and a compound corresponding to the general formula

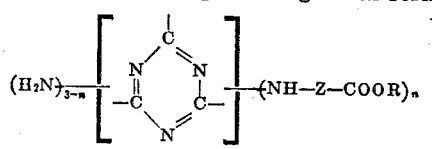

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, and Z represents a member of the class consisting of divalent aliphatic hydrocarbon radicals and divalent aromatic and nuclearly halogenated aromatic hydrocarbon radicals.

8. A product comprising the cured resinous composition of claim 7.

9. A composition comprising the product of reaction of ingredients including an aldehyde and a compound corresponding to the general formula

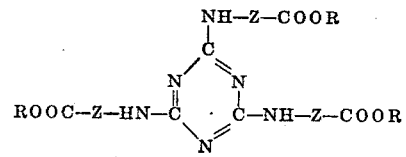

where R represents a monovalent aliphatic hydrocarbon radical and Z represents a divalent aromatic hydrocarbon radical.

10. A composition comprising the product of reaction of ingredients including an aldehyde and a compound corresponding to the general formula

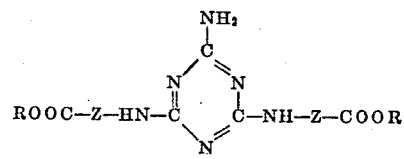

where R represents a monovalent aliphatic hydrocarbon radical and Z represents a divalent aromatic hydrocarbon radical.

11. A composition comprising the product of reaction of ingredients including an aldehyde and a compound corresponding to the general formula

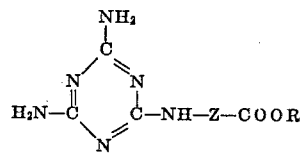

where R represents a monovalent aliphatic hydrocarbon radical and Z represents a divalent aromatic hydrocarbon radical.

12. A resinous composition comprising the product of reaction of ingredients comprising an aldehyde and a carboalkoxyarylamino diamino s-triazine.

13. A composition comprising the resinous condensation product of ingredients comprising an aldehyde and a carbomethoxyanilino diamino s-triazine.

14. A resinous composition comprising the condensation product of ingredients comprising formaldehyde and ortho-carbomethoxyanilino diamino s-triazine.

15. A composition comprising the product of reaction of ingredients comprising a urea, an aldehyde and a compound corresponding to the general formula

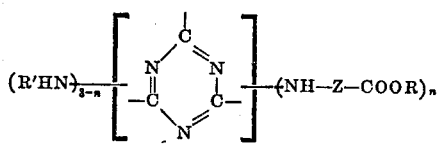

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

16. A composition comprising the resinous product of reaction of ingredients comprising urea, formaldehyde and a compound corresponding to the general formula

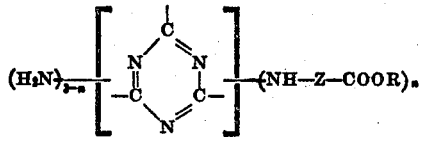

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, and Z represents a member of the class consisting of divalent aliphatic hydrocarbon radicals and divalent aromatic and nuclearly halogenated aromatic hydrocarbon radicals.

17. A composition comprising the resinous product of reaction of ingredients comprising urea, formaldehyde and ortho-carbomethoxyanilino diamino s-triazine.

18. A composition comprising the product of reaction of ingredients comprising melamine, an aldehyde and a compound corresponding to the general formula

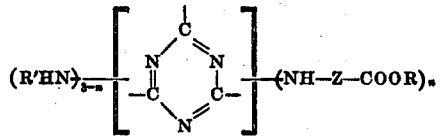

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

19. A heat-curable composition comprising the heat-convertible resinous reaction product of (1) a partial condensation product of ingredients comprising formaldehyde and a compound corresponding to the general formula

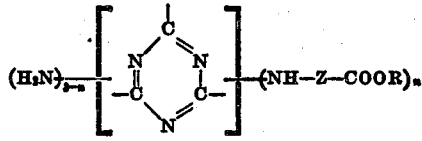

where $n$ is 1, R represents a member of the class consisting of monovalent aliphatic hydrocarbon radicals and monovalent aromatic and nuclearly halogenated aromatic hydrocarbon radicals, and Z represents a member of the class consisting of divalent aliphatic hydrocarbon radicals and divalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

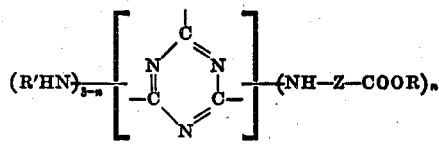

where $n$ represents an integer and is at least 1 and not more than 3, R represents a member of the class consisting of monovalent aliphatic hydrocarbon radicals and monovalent aromatic and nuclearly halogenated aromatic hydrocarbon radicals, R' represents a member of the class which is the same as R and in addition hydrogen, and Z represents a member of the class consisting of divalent aliphatic hydrocarbon radicals and divalent aromatic and nuclearly halogenated aromatic hydrocarbon radicals.

21. A composition comprising the resinous reaction product of (1) a chlorinated acetamide and (2) a product of partial reaction of ingredients including a carboalkoxyarylamino diamino s-triazine and formaldehyde.

22. A composition comprising the resinous reaction product of (1) a chlorinated acetamide and (2) a product of partial reaction under alkaline conditions of ingredients including a carbomethoxyanilino diamino s-triazine and formaldehyde.

GAETANO F. D'ALELIO.
JAMES W. UNDERWOOD.